United States Patent
Beard (10) Patent No.: US 10,067,708 B2
(45) Date of Patent: Sep. 4, 2018

(54) MEMORY SYNCHRONIZATION FILTER

(71) Applicant: ARM Limited, Cambridge (GB)

(72) Inventor: Jonathan Curtis Beard, Austin, TX (US)

(73) Assignee: Arm Limited, Cambridge (GB)

(*) Notice: Subject to any disclaimer, the term of this patent is extended or adjusted under 35 U.S.C. 154(b) by 136 days.

(21) Appl. No.: 14/978,001

(22) Filed: Dec. 22, 2015

(65) Prior Publication Data

US 2017/0177269 A1 Jun. 22, 2017

(51) Int. Cl.
*G06F 12/10* (2016.01)
*G06F 3/06* (2006.01)

(52) U.S. Cl.
CPC .......... *G06F 3/0647* (2013.01); *G06F 3/0619* (2013.01); *G06F 3/0683* (2013.01)

(58) Field of Classification Search
CPC ... G06F 3/0647; G06F 12/0864; G06F 3/0683
USPC ....................................... 711/165
See application file for complete search history.

(56) References Cited

U.S. PATENT DOCUMENTS

| | | | |
|---|---|---|---|
| 2002/0073276 A1 | 6/2002 | Howard et al. | |
| 2008/0235477 A1 | 9/2008 | Rawson | |
| 2013/0326186 A1 | 12/2013 | Shaikh et al. | |
| 2014/0136811 A1 | 5/2014 | Fleischer et al. | |
| 2016/0124864 A1* | 5/2016 | Sun | G06F 12/1018 711/216 |

OTHER PUBLICATIONS

Krishnamurthy et al., J VLSI Signal Process Syst Signal Image Video Technol. 2007; 49(1): 101-121, Oct. 8, 2008.
Buhler et al., "Mercury BLASTN: Faster DNA Sequence Comparison Using a Streaming Hardware Architecture," in Proc. of Reconfigurable Systems Summer Institute, Jul. 2007.
Elliott et al., "Computational RAM: implementing processors in memory," in Design & Test of Computers, IEEE, vol. 16, No. 1, pp. 32-41, Jan.-Mar. 1999.
Lloyd et al., "In-Memory Data Rearrangement for Irregular, Data-Intensive Computing", Computer, vol. 48, No. 8, pp. 18-25, Aug. 2015.

(Continued)

*Primary Examiner* — Jae Yu
(74) *Attorney, Agent, or Firm* — Leveque IP Law, P.C.

(57) ABSTRACT

Data synchronization between memories of a data processing system is achieved by transferring the data blocks from a first memory to a second memory, forming a hash list from addresses of data blocks that are written to the second memory or modified in the second memory. The hash list may be to identify a set of data blocks that are possibly written to or modified. Data blocks that are possibly modified may be written back from the second memory to the first memory in response to a synchronization event. The hash list may be updated by computing, in hardware or software, hash functions of an address of the transferred or modified data block to determine bit positions to be set. The hash list may be queried by computing hash functions of an address to determine bit positions, and checking bits in the hash list at those bit positions.

16 Claims, 3 Drawing Sheets

(56) References Cited

OTHER PUBLICATIONS

Carter et al., "Impulse: building a smarter memory controller," in High-Performance Computer Architecture, 1999. Proceedings. Fifth International Symposium On, vol., No., pp. 70-79, Jan. 9-13, 1999.
Marty, Michael R. Cache coherence techniques for multicore processors. ProQuest, 2008.
Bloom, Burton H. "Space/time trade-offs in hash coding with allowable errors." Communications of the ACM 13.7 (1970): 422-426.
Hall et al., "Mapping Irregular Applications to DIVA, a PIM-based Data-Intensive Architecture," in Supercomputing, ACM/IEEE 1999 Conference, vol., No., pp. 57-57, Nov. 13-18, 1999.
Gokhale et al., "Processing in memory: The Terasys massively parallel PIM array." Computer 28.4 (1995): 23-31.
Dharmapurikar et al. "Deep packet inspection using parallel bloom fillers." High performance interconnects, 2003. proceedings. 11th symposium on. IEEE, 2003.
Zhou et al., "HARD: Hardware-assisted lockset-based race detection." High Performance Computer Architecture, 2007. HPCA 2007. IEEE 13th International Symposium on. IEEE, 2007.
Liu et al., "RAIDR: Retention-aware intelligent DRAM refresh." Computer Architecture (ISCA), 2012 39th Annual International Symposium on. IEEE, 2012.
Rajwar et al., "Virtualizing transactional memory." Computer Architecture, 2005. ISCA'05. Proceedings. 32nd International Symposium on. IEEE, 2005.
Fung et al.,. "Hardware transactional memory for GPU architectures." Proceedings of the 44th Annual IEEE/ACM International Symposium on Microarchitecture. ACM, 2011.
Gokhale et al., "Near memory data structure rearrangement", Memory System, SCM, Oct. 5, 2015, pp. 283-290.

\* cited by examiner

MEMORY SYNCHRONIZATION FILTER

GOVERNMENT LICENSE RIGHTS

This invention was made with Government support under the Fast Forward 2 contract awarded by DOE. The Government has certain rights in this invention.

BACKGROUND

The process of copying data from a memory, such as disk or RAM for example, and re-arranging it in a temporary memory for input to a data processor is used in many applications. After the data has been processed, and possibly at various intermediate times during the processing, the memories are synchronized by writing the re-arranged data back to the original memory, regardless of whether or not the data has been modified. This is inefficient, since unmodified data is written back unnecessarily.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. In these drawings, like reference numerals identify corresponding elements.

DETAILED DESCRIPTION

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The process of a reading data from a memory, re-arranging it, modifying some of it, and writing the data back to the memory is used in many other applications. Data may be re-arranged using Data Re-organization Engine (DRE), for example. A Data Re-organization Engine (DRE) takes data and re-organizes it in a programmatic (or fixed) way as specified by a programmer or designer. The re-arranged data segments map back to data segments in the original arrangement that are resident in memory (either physical RAM, disk, solid state drive (SSD), flash memory, or some other form of storage).

In accordance with various embodiments of the disclosure, there is provided a Synchronization Filter that identifies data that is unmodified in order to reduce unnecessary write-back of unmodified data to a memory.

The Synchronization Filter may be used, for example, in a Compute Near Memory (CNM) data processing system. The performance of data processing system is often limited by the speed of the memory rather than the speed of the processing. This has led to the development of high-speed cache memories that are widely used in commercially available data processing systems. This has also led to the investigation of systems where processing and memory are implemented in the same integrated circuit. These systems are referred at Compute Near Memory (CNM) systems, Processor in Memory (PIM) systems, Near Memory Processing (NMP) systems, Near Data Processing (NDP) systems, etc. The term Compute Near Memory (CNM) system will be used herein.

The Synchronization filter provides the ability to maintain the state of a memory throughout a page-out process and to transfer the state to multiple other CNM nodes without communicating to the main processor to find out which data elements are 'dirty' (even if it still had that information), without synchronizing to main memory every time a page-out occurs, and without writing back the entire segment to main memory.

Figure 1:
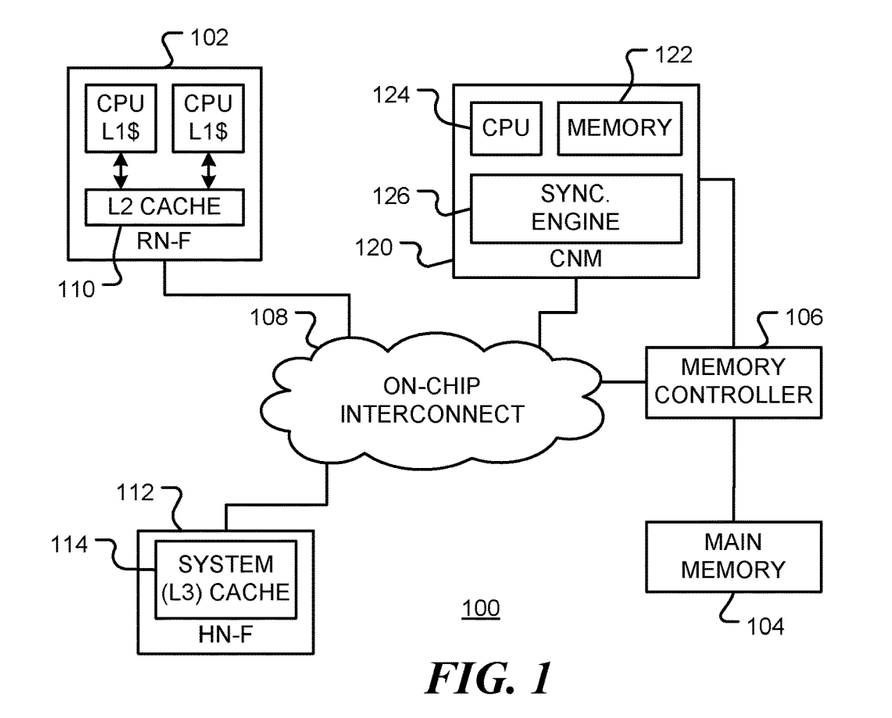
FIG. 1 is a block diagram of a data processing system, in accordance with various representative embodiments.

FIG. 1 is a block diagram of a data processing system, in accordance with various representative embodiments. The data processing system is arranged as a network of functional blocks including processor block or request node 102 that can (i) read data from a main memory 104 via a memory controller 106 and an interconnect circuit 108, (ii) modify the data, and (iii) write the data back to the main memory 104. To compensate for the slower speed of the memory 104, the processor block 102 may include one or more processors, each with an L1 cache for temporary data storage. The one or more processors may also share an L2 cache for temporary storage of shared data. When multiple processor blocks 102 are present in the system 100, one or more home nodes 112 may be provided. The home nodes 112 include a system or L3 cache 114 that provides a temporary home for data that may be shared between multiple request nodes 102. The request nodes 102 and home nodes 114 may implement a cache coherence protocol.

The data processing system 100 may include a Compute Near Memory (CNM) processing block 120. In a CNM system, a subset of data from main memory is rearranged and loaded into a 'scratchpad' memory 122 close to a processor 124. A rearrangement may comprises copying data from the main memory with a fixed or programmed offset, or a fixed or programmed step size, for example, However, the rearrangement may take any form, with address order being maintained or changed. Synchronization events, which occur at various times, cause the main memory 104 and the scratchpad memory 122 to be synchronized by writing the contents of the scratchpad memory 122 back to main memory 104. In accordance with various embodiments of the disclosure, the CNM system 120 includes a Synchronization Filter 126 that controls which elements of the scratchpad memory 122 are written back to the main memory 104. Only data that is determined to be 'possibly modified' is written back to the main memory. Data that is determined to be unmodified is not written back.

Figure 2:
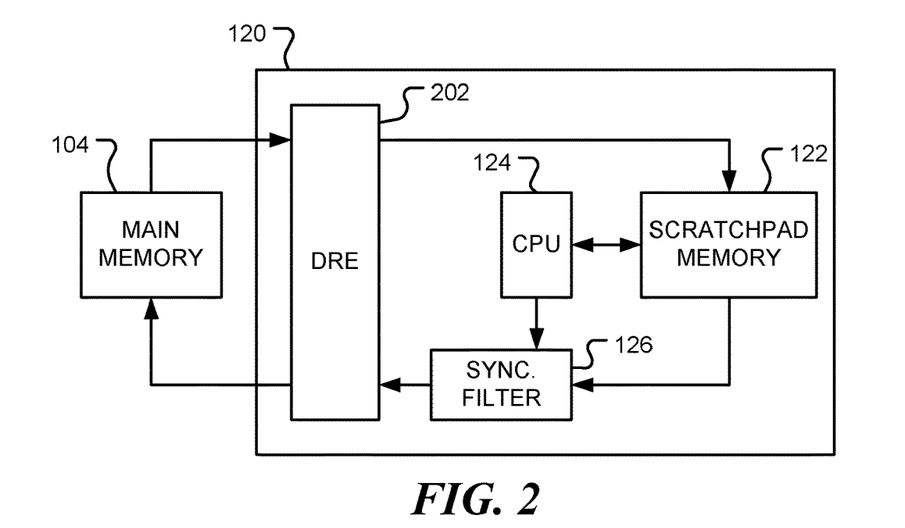
FIG. 2 is a block diagram of a Computer Near Memory (CNM) system, in accordance with various representative embodiments.

FIG. 2 is a block diagram of a Computer Near Memory (CNM) system 120, in accordance with various representative embodiments. The CNM system 120 is coupled to a main memory 104. The main memory may be a mass storage medium such as a hard disc drive, floppy disc drive, optical disc drive; optical storage elements, magnetic storage elements, magneto-optical storage elements, flash memory, core memory and/or other equivalent storage technologies. This may be done via a memory controller, for example. Data Reorganization Engine (DRE) 202 reads data segments from the main memory 104, rearranges them and stores them in scratchpad memory 122. The re-arranged data segments (READS) are the only data that are passed to processor 124 (via some form of bus for example) for processing. This eliminates extraneous data transfers, improving bandwidth utilization and improving cache line use, since the original data may not be stored at contiguous addresses in the original memory.

During typical usage of a DRE, the rearranged data may be modified by write operations. The write operations can either be to the entire rearranged data segment or they can be far more sparse. After processing, the entire data segment may be written back to memory, regardless of its modification state. However, this is inefficient since unmodified data is written back unnecessarily. In response to a synchronization event, which may be automatic or programmed by a user, Synchronization Filter 126 selects between data that has definitely not been modified and data that has possibly been modified. In accordance with various embodiments, the Synchronization Filter stores a Hash List is created that provides a persistent memory of which writes have occurred. In one embodiment, the Hash List is stored within the head of the READ segment. The data may be written back to the main memory via the DRE 202.

The Synchronization Filter 126 may be incorporated in the DRE 202.

In a further embodiment, the synchronization filter is used to track which data elements or blocks are transferred from the main memory 202 to the scratchpad memory 122. These elements are sometimes referred to as 'dirty'. In this embodiment, the Hash List may be used to determine which data blocks have definitely not be copied into the scratchpad memory 122 and are therefore 'clean'. Another CNM device can use the Hash List to determine the state of data in the memory.

Figure 3:
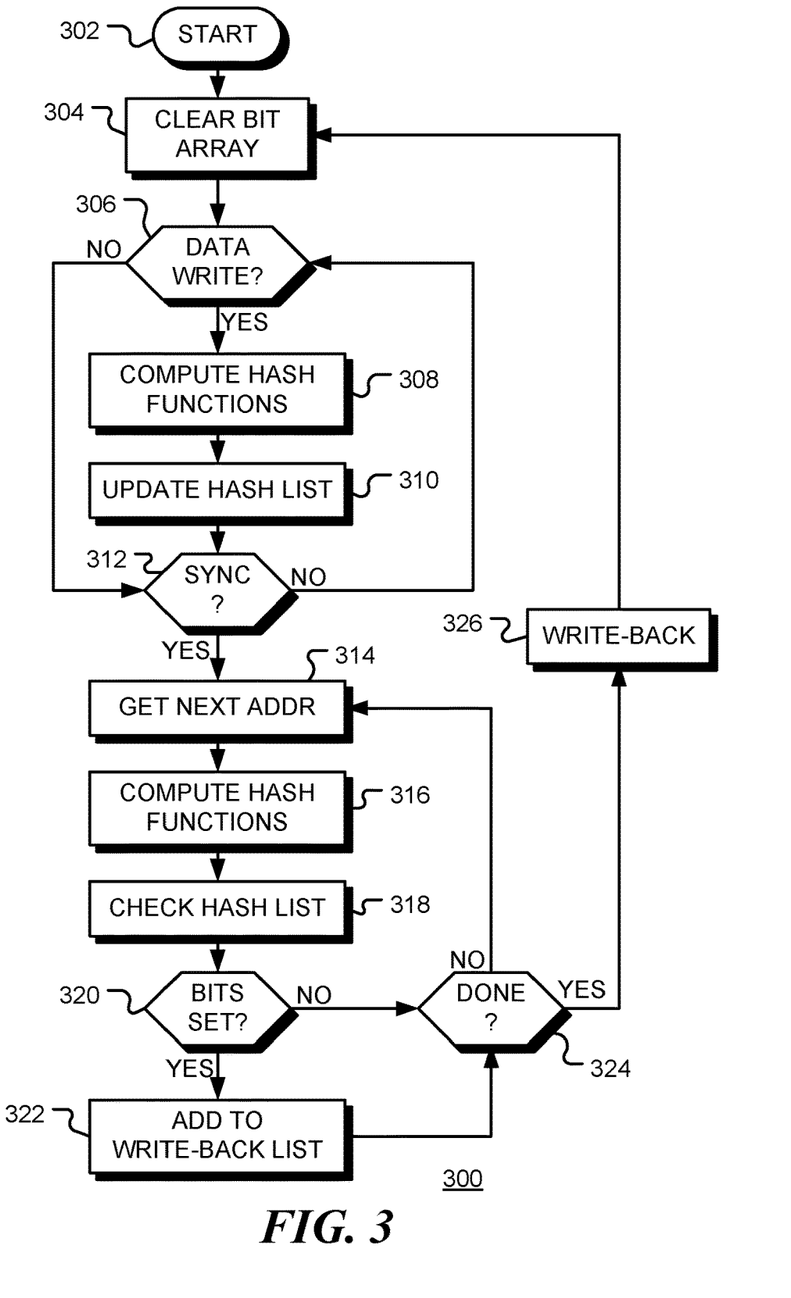
FIG. 3 is a flow chart of a method for data synchronization, in accordance with various representative embodiments.

FIG. 3 is a flow chart 300 of a method for data synchronization, in accordance with various representative embodiments. The method may be used in a data processing system to track data addresses have been written to during processing. This is done without storing a list of addresses, which could consume a prohibitively large amount memory.

Following start block 302 in FIG. 3, a Hash List is cleared at block 304. The Hash List may be stored in a READ segment or at another location. At block 306 it is determined if a new data write has occurred at a READS element. If a new data write operation has occurred, as depicted by the positive branch from decision block 306, the address is added to a Hash List (HL). The Hash List is a bit vector that provides a persistent memory of which writes have occurred. The Hash List may be constructed by various methods, including known methods such as a Bloom Filter, or Cuckoo hashing or others methods. These methods may have different rates of false positive results, which cause a small amount of unmodified data to be written back to memory, but they do not give any false negatives, so accurate synchronization is achieved. In other words, the method allows data to be classified as either 'possibly modified' or 'definitely not modified'. The Hash List may be created in the head of READ segment, for example. The address is generally the address of a block of data. The data blocks may be of any size, from a single byte to one or more pages for example. Generally, an increased number of data blocks in the READS (finer granularity) might be associated with more complex hash functions or a larger Hash List, but could result in the writing-back of fewer data elements, since a complete block is written back if any element in the block is modified. The exact granularity of the elements monitored is a design choice. For example, each byte written back could be inserted into the Hash List or each page written to could be inserted. Additionally, the granularity may be determined at allocation time, so that differing sizes of allocations have different synchronization granularities.

At block 308, a number of hash functions of the (block) address of the data write operation are computed. The hash functions are used, at block 310, to update a Hash List. Blocks 308 and 310 may be performed in dedicated hardware, or in hardware configured by a program of software instructions. The hash functions may be performed in series or parallel, or a combination thereof. In some example embodiments, each hash function generates an output that indicates a bit of the Hash List to be set or incremented. For example, if three hash functions are used, each new address will cause three bits of the Hash List to be set. In other embodiments, a particular hash function might indicate 'nothing to set'. Other methods of filtering may be used without departing from the present disclosure. Flow then continues to decision block 312. Flow also continues to decision block 312 if no new write to a READS element has occurred, as depicted by the negative branch from decision block 306.

At decision block 312 a check is made to determine if a synchronization event has occurred. The synchronization event may be user-generated or automatic. If not, as depicted by the negative branch from decision block 312, flow returns to decision block 306. If a synchronization event has occurred, as depicted by the positive branch from decision block 312, the Hash List is queried for each potential data block to be written back. At block 314 the next address to be queried is obtained. This is the address of a block in the READS, using the same block granularity that was used to create the Hash List. Each address may cover a range of indices. The hash functions of the address are computed at block 316. The computation may be performed by the same dedicated hardware that was used to create the Hash List. The computed hash functions indicated which bits of the Hash List are to be checked at block 318. If all of the bits of the Hash List indicated by the computed hash functions are set, as depicted by the positive branch from decision block 320, the corresponding READS elements are added, at block 322, to a list or map of elements to be written back to the main memory. When all of the bits of the Hash List indicated by the computed hash functions are set, this is referred to as a positive hit. If one or more of the indicated bits in the Hash List are not set, as depicted by the negative branch from decision block 320, flow continues to decision block 324.

At decision block 324, a check is made to determine if all of the addresses for the READS have been checked. If not, as indicated by the negative branch from decision block 324, flow returns to block 314. If all addresses have been checked, as indicated by the positive branch from decision block 324, the parent segment of data in the original memory, from which the READS segment was formed, is overwritten at block 326. The memory is overwritten at the specific indices which were found in the Hash List. The synchronization is now complete and flow returns to block 304.

The following is a pseudo-code listing of operation of the Synchronization Filter to use a hash list hl to create a write-back list M and then write the contents of the list back to the original memory.

| PSEUDO-CODE LISTING |
|---|
| 1. HL      hl = DRE.getHL( ) |
| 2. MAP    M |
| 3. FOR x ∈ ADDRESS_RANGE DO |
| 4.    IF( hl.isModified( x ) ) |
| 5.    { |
| 6.      M.add( x ) |
| 7.    } |
| 8. END FOR |
| 9. |
| 10. FOR ALL_ELEMENTS DO |
| 11.    MEM.COPY( M.DRE, M.ORIG ) |
| 12. END FOR |

Figure 4:
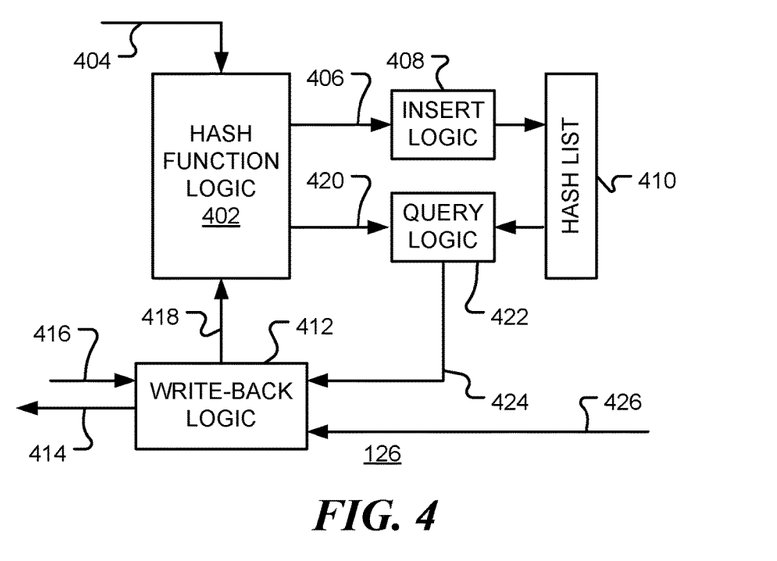
FIG. 4 is a block diagram of a synchronization filter, in accordance with various representative embodiments.

FIG. 4 is a block diagram of a synchronization filter 126 of a data processing system, in accordance with various representative embodiments. The synchronization filter 126 includes hash function logic 402 that produces hash functions of an address 404 of a data block received from a processor when the processor writes data to an element of the data block stored in a temporary or scratchpad memory. Hash function logic 402 implements a number of hash functions and generates a number of bit positions 406. Insert logic 408 is operable to set bits in a hash list memory 410 at the bit positions. Thus, the hash list memory 410 is updated whenever data in the scratchpad memory is modified.

Write-back logic 412 is operable to transfer blocks of data 414 that is determined to be 'possibly modified' from the scratchpad memory to a main memory, in response to a synchronization signal 416 from the processor. The write-back logic 412 generates a series of addresses 418 that are loaded into the hash function logic 402 to generate a number of bit positions 420 that are passed to query logic 422. Query logic 422 is operable to check bits in the hash list memory 410 at the bit positions to determine if that block of data at the address is unmodified, and responds with signal 424 to write-back logic 412. Write-back logic 412 reads data 426 that is determined to be 'possibly modified' from the scratchpad memory and transfers to the main memory at 414. The data 414 may be transferred to the main memory via a data re-organization engine that translates scratchpad addresses into corresponding main memory addresses.

The various logic blocks in FIG. 4 may be implemented in dedicated hardware, reconfigurable hardware, software, of a combination thereof. Dedicated or reconfigurable hardware may be described by instructions of a Hardware Description Language such as Verilog or VHDL, for example. The instructions may be stored for distribution on non-transient computer readable media, or distributed via a network, such as the Internet, or by other means.

An advantage of storing the Hash List in memory, aligned with the READS, is that the tracking of multiple READ segments is simplified. This approach also enables the use of multiple DRE's within a Non Uniform Memory Allocation (NUMA) scheme or other distributed allocation scheme. For example, a DRE which did not produce the READS segment can take up this Hash List and continue to use it to reduce writes within the non-creator node. The Synchronization Filter described above, can provide faster, more energy efficient programmable memory that is able to operate in multi-processor NUMA-like systems.

The Hash List could be stored in fast memory within the DRE itself, however this approach may not scale as easily to N DRE elements or multiple threads and may be less practical for NUMA and other distributed schemes, since each migration might require network synchronization between multiple DRE units outside of simply reading a new global memory address.

The Hash List provides a description of the state of the memory. Thus a description of the state may be transferred to another device, such as another CNM device, by providing a copy of the Hash List or providing access to the Hash List. This avoids having to synchronize data back to the main memory before it can be accessed by another device.

Figure 5:
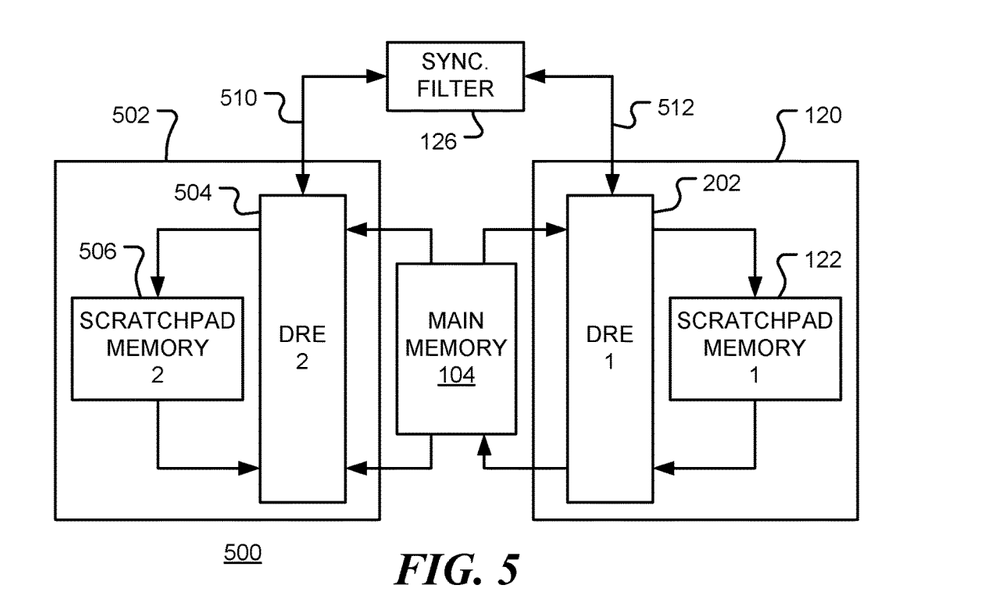
FIG. 5 is a block diagram of a Computer Near Memory (CNM) system, in accordance with various representative embodiments.

FIG. 5 is a block diagram of a Computer Near Memory (CNM) system 500, in accordance with various representative embodiments. In one embodiment, a first data re-organization engine (DRE) 202 of a first CNM device 120 transfers data blocks from a main memory 104 to a scratchpad memory 122. When a second CNM device 502, with DRE 504, wishes to copy data from the main memory 104 to its own scratchpad memory 506, it queries the hash list in synchronization filter 126 to determine if a data block in the first memory has been possibly transferred from the main memory 104, or definitely not transferred to the memory 122. The second device may operate in different ways dependent upon the result of the query. For example, if the data is possibly transferred, a synchronization event may be generated to cause the main memory to be updated, or the data may be marked as 'dirty'.

As described above the hash list may be formed by computing a plurality of hash functions of an address of a data block transferred from the first (main) memory 104 to the second (scratchpad 1) memory 122 to provide a plurality of bit positions; and setting bits of the hash list at the plurality of bit positions. Querying the hash list at an address of a block of data to be transferred to the scratchpad 2 memory 506 may be performed by computing a plurality of hash functions of the address to provide a plurality of bit positions, and checking bits in the hash list at the plurality of bit positions.

In a further embodiment, DRE's 120 and 502 may both update the hash list in synchronization filter 126 and both query the hash list prior to transferring data from the main memory.

The system 500 may contain additional DRE's and other processors.

Various embodiments relate to a data processing system that includes a hardware processor operable to modify one or more blocks of data of a plurality of blocks of data stored in a first memory and a synchronization filter The synchronization filter includes hash function logic that generates a plurality of bit positions in response to an address of a block of data, a hash list memory, insert logic operable to set bits in the hash list memory at the plurality of bit positions when a block of data at the address is modified by the hardware processor, and query logic operable to check bits in the hash list memory at the plurality of bit position to determine if a block of data at the address is unmodified or possibly modified. The hash function logic of the synchronization filter may be implemented in dedicated hardware, reconfigurable hardware, or a programmed processor, for example.

The data processing system may include the first memory configured as one or more data segments, each comprising a hash list memory. The processor and the first memory may be located in the same integrated circuit as one another.

The data processing system may also include a data re-organization engine (DRE) operable to transfer data from a second memory to the first memory. The synchronization filter may also include write-back logic operable to transfer blocks of data, determined to be possibly modified, from the first memory to the second memory in response to a synchronization event. The synchronization event is generated automatically or in response to an instruction programmed by a user.

The synchronization filter may be a Bloom filter, or bits in the hash list memory of the synchronization filter are set by Cuckoo hashing.

The hardware processor may be a data re-organization engine (DRE), in which case modifying a block of data of the plurality of blocks of data stored in the first memory comprises the DRE transferring a block of data from the second memory to the first memory.

Various embodiments relate to a method for data synchronization between a first memory and a second memory. The method comprises transferring data blocks from the first memory to the second memory, forming a hash list from addresses of data blocks in the second memory that are modified by a processor coupled to the second memory, responsive to a synchronization event, querying the hash list to identify a set of data blocks that are possibly modified, and transferring the set of data blocks that are possibly modified from the second memory to the first memory. The hash list may be formed by a Bloom filter or by Cuckoo hashing. The hash list may be formed by computing a plurality of hash functions of an address of the modified data block to provide a plurality of bit positions, and setting bits of the hash list at the plurality of bit positions.

The hash list may queried for an address by computing a plurality of hash functions of the address to provide a plurality of bit positions, and checking bits in the hash list at the plurality of bit positions.

Computing the plurality of hash functions may be performed by loading an address into a dedicated logic circuit comprising a plurality of parallel hash functions.

Transferring the data blocks from the first memory to the second memory may be performed by reading data blocks from the first memory, re-organizing the data blocks and storing the re-organized data in the second memory.

Data in the second memory may comprise one or more segments, in which case the method further comprises, for each segment of the one or more segments, forming a hash list for the segment; and storing the hash list in the segment.

Various further embodiments relate to a method for synchronizing data by forming a hash list from addresses of data blocks transferred from a first memory to a second memory by first data re-organization engine (DRE) and, prior to transferring a data block to a third memory by a second DRE, querying the hash list to determine if a data block in the first memory has not been transferred from a first memory to a second memory. Forming the hash list may comprise computing a plurality of hash functions of an address of a data block transferred from the first memory to the second memory to provide a plurality of bit positions, and setting bits of the hash list at the plurality of bit positions, and querying the hash list at an address of a block of data to be transferred to the third memory may comprise computing a plurality of hash functions of the address to provide a plurality of bit positions and checking bits in the hash list at the plurality of bit positions.

It will be appreciated that some or all functions described herein could be implemented by custom logic, such a state machine, that has no stored program instructions, in one or more application specific integrated circuits (ASICs), in reconfigurable logic such as an FPGA, or in one or more programmed processors having stored instructions. Of course, a combination of these approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such integrated circuits, software instructions and programs with minimal experimentation.

As used herein, the term processor, controller or the like may encompass a processor, controller, microcontroller unit (MCU), microprocessor, graphics processing unit (GPU), a digital signal processor (DSP), a field programmable gate array (FPGA), an application specific integrated circuit (ASIC) device, a memory controller or an I/O master device.

Those skilled in the art will recognize that the present disclosure has been described in terms of exemplary embodiments, but it not so limited. The present disclosure could be implemented using hardware components, such as special purpose hardware and/or dedicated processors which are equivalents to the disclosure as described and claimed.

Similarly, general purpose computers, microprocessor based computers, micro-controllers, optical computers, analog computers, dedicated processors and/or dedicated hard wired logic may be used to construct alternative equivalent embodiments of the present disclosure.

Moreover, those skilled in the art will appreciate that a program flow and associated data used to implement the embodiments described above can be implemented using various forms of storage such as Read Only Memory (ROM), Random Access Memory (RAM), Electrically Erasable Programmable Read Only Memory (EEPROM); non-volatile memory (NVM); mass storage such as a hard disc drive, floppy disc drive, optical disc drive; optical storage elements, magnetic storage elements, magneto-optical storage elements, flash memory, core memory and/or other equivalent storage technologies without departing from the present disclosure. Such alternative storage devices should be considered equivalents.

Various embodiments described herein are implemented using programmed processors executing programming instructions that are broadly described in flow chart form that can be stored on any suitable electronic storage medium or transmitted over any suitable electronic communication medium. However, those skilled in the art will appreciate that the processes described above can be implemented in any number of variations and in many suitable programming languages without departing from the present disclosure. For example, the order of certain operations carried out can often be varied, additional operations can be added or operations can be deleted without departing from the disclosure. Error trapping can be added and/or enhanced and variations can be made in user interface and information presentation without departing from the present disclosure. Such variations are contemplated and considered equivalent.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:

1. A data processing system comprising: a hardware processor operable to modify one or more blocks of data of a plurality of blocks of data; a synchronization filter comprising: hash function logic that generates a plurality of bit positions in response to an address of a block of data; a hash list memory; insert logic operable to set bits in the hash list memory at the plurality of bit positions when a block of data at the address is modified by the hardware processor; and query logic operable to check bits in the hash list memory at the plurality of bit positions, where a block of data at the address is determined to be unmodified when a bit in a least one of the plurality of bit positions is not set and is determined to be possibly modified when bits in all of the plurality of bit positions are set, and a data re-organization engine (DRE) operable to transfer data from a second memory to a first memory; where the synchronization filter further comprises write-back logic operable to transfer blocks of data, determined by the query logic to be possibly modified, from the first memory to the second memory in response to a synchronization event, and where blocks of data determined by the query logic to be unmodified are not transferred from the first memory to the second memory in response to a synchronization event.

2. The data processing system of claim 1, further comprising a first memory, where the plurality of blocks of data are stored in the first memory.

3. The data processing system of claim 2, where the first memory comprises one or more data segments, each comprising a hash list memory.

4. The data processing system of claim 2, where the processor and the first memory are located in the same integrated circuit as one another.

5. A non-transient computer readable medium storing instructions of a Hardware Description Language that describe the data processing system of claim 1.

6. The data processing system of claim 1, where the synchronization event is generated automatically or in response to an instruction programmed by a user.

7. The data processing system of claim 1, where the hash function logic of the synchronization filter comprises dedicated hardware.

8. The data processing system of claim 1, where the synchronization filter comprises a Bloom filter.

9. The data processing system of claim 1, where bits in the hash list memory of the synchronization filter are set by Cuckoo hashing.

10. The data processing system of claim 1, where modifying a block of data of the plurality of blocks of data stored in the first memory comprises the DRE transferring a block of data from the second memory to the first memory.

11. A method for data synchronization between a first memory and a second memory, the method comprising: transferring data blocks from the first memory to the second memory; forming a hash list from addresses of data blocks in the second memory that are modified by a processor coupled to the second memory; and responsive to a synchronization event: querying the hash list to identify a set of data blocks that are possibly modified where data blocks at addresses not found in the hash list are unmodified and are not included in the set; and transferring the set of data blocks that are possibly modified from the second memory to the first memory, where unmodified data blocks are not transferred from the second memory to the first memory where querying the hash list at an address comprises: computing a plurality of hash functions of the address to provide a plurality of bit positions; and checking bits in the hash list at the plurality of bit positions, and where computing the plurality of hash functions comprises loading an address into a dedicated logic circuit comprising a plurality of parallel hash functions.

12. The method of claim 11, where the hash list is formed by a Bloom filter.

13. The method of claim 11, where the hash list is formed by Cuckoo hashing.

14. The method of claim 11, where forming the hash list comprises:

computing a plurality of hash functions of an address of the modified data block to provide a plurality of bit positions; and setting bits of the hash list at the plurality of bit positions.

15. The method of claim 11, where transferring the data blocks from the first memory to the second memory comprises reading data blocks from the first memory, re-organizing the data blocks and storing the re-organized data in the second memory.

16. The method of claim 11, where data in the second memory comprises one or more segments, the method further comprising, for each segment of the one or more segments:
 forming a hash list for the segment; and
 storing the hash list in the segment.

* * * * *